United States Patent
Rolland

(10) Patent No.: US 9,346,634 B2
(45) Date of Patent: May 24, 2016

(54) SYSTEM AND METHOD FOR PASSING MATTER IN A FLOW PASSAGE

(75) Inventor: Nils Lennart Rolland, Nyborg (NO)

(73) Assignee: Statoil Petroleum AS, Stavanger (NO)

( * ) Notice: Subject to any disclaimer, the term of this patent is extended or adjusted under 35 U.S.C. 154(b) by 0 days.

(21) Appl. No.: 13/701,389

(22) PCT Filed: Jun. 3, 2011

(86) PCT No.: PCT/EP2011/059204
§ 371 (c)(1),
(2), (4) Date: Dec. 19, 2012

(87) PCT Pub. No.: WO2011/151446
PCT Pub. Date: Dec. 8, 2011

(65) Prior Publication Data
US 2013/0101361 A1    Apr. 25, 2013

(30) Foreign Application Priority Data
Jun. 3, 2010   (NO) .................................. 20100800

(51) Int. Cl.
*B65G 53/66* (2006.01)
*B65G 53/30* (2006.01)
*E21B 21/08* (2006.01)
*E21B 21/10* (2006.01)

(52) U.S. Cl.
CPC ................ *B65G 53/30* (2013.01); *E21B 21/08* (2013.01); *E21B 21/10* (2013.01)

(58) Field of Classification Search
USPC .......................................................... 406/12
See application file for complete search history.

(56) References Cited

U.S. PATENT DOCUMENTS

| | | | |
|---|---|---|---|
| 3,232,494 A * | 2/1966 | Poarch ............................ | 406/93 |
| 3,477,526 A | 11/1969 | Jones et al. | |
| 3,827,511 A | 8/1974 | Jones | |
| 4,282,939 A * | 8/1981 | Maus ...................... | E21B 21/08 |
| | | | 175/48 |
| 7,044,237 B2 * | 5/2006 | Leuchtenberg ......... | E21B 21/08 |
| | | | 166/53 |
| 7,350,597 B2 * | 4/2008 | Reitsma et al. .................. | 175/66 |
| 8,070,131 B2 * | 12/2011 | Liew ............................. | 251/326 |
| 8,281,875 B2 * | 10/2012 | Lovorn .................... | E21B 21/10 |
| | | | 175/25 |
| 8,973,674 B2 * | 3/2015 | Leuchtenberg ....... | E21B 19/006 |
| | | | 166/358 |
| 2005/0092523 A1 | 5/2005 | McCaskill et al. | |
| 2008/0041149 A1 | 2/2008 | Leuchtenberg | |
| 2009/0288821 A1 | 11/2009 | Eriksen et al. | |

FOREIGN PATENT DOCUMENTS

| | | |
|---|---|---|
| NO | 20100799 A1 | 12/2011 |
| WO | 2004/005667 A1 | 1/2004 |
| WO | 2008/045381 A2 | 4/2008 |

* cited by examiner

*Primary Examiner* — William R Harp
(74) *Attorney, Agent, or Firm* — Birch, Stewart, Kolasch & Birch, LLP

(57) ABSTRACT

A system is provided for passing matter in a flow passage of an oil and/or gas drilling or production installation, in particular for passing trash or drill cuttings in a drilling fluid return line. The system includes at least two valves arranged in series in the passage; and a control device configured to selectively or sequentially actuate the at least two valves, such that the material is allowed to pass the at least two valves in the passage. A method is also provided for passing trash or drill cuttings in a drilling fluid return line.

13 Claims, 4 Drawing Sheets

SYSTEM AND METHOD FOR PASSING MATTER IN A FLOW PASSAGE

BACKGROUND OF THE INVENTION

1. Field of the Invention

The present invention relates to a system and method for passing matter in a flow passage, in particular for passing trash or drill cuttings in a drilling fluid return line of an oil and/or gas drilling installation.

2. Background of the Invention

When drilling for oil and/or gas, a drilling fluid (e.g. drilling mud or seawater) is typically pumped from a drilling rig down the borehole to lubricate and cool the drill bit as well as to provide a means for removing drill cuttings from the borehole. After emerging from the drill bit, the drilling fluid flows up the borehole through the annulus formed by the drill string and the borehole.

In US2005/0092523 (McCaskill et al.), the flow of drilling fluid from the annulus passes upward through a casing, and exits the casing through laterally opening bell nipple. The exiting flow is conducted through a flowline to a choke or a choke manifold. Two chokes are associated with the choke manifold. Flow exiting from the choke or choke manifold is transported to a sump or mud pit via a return line.

The two chokes in US2005/0092523 are arranged in parallel. Typically, two chokes are used for redundancy, so that if one choke has to be taken out of service, the flow can be directed through the other choke.

However, a problem with the system in US2005/0092523, and other known systems, is that drill cuttings may clog the choke or choke manifold (or other valves or the like in a drilling fluid return line), which in turn negatively effects the performance of the system. The borehole bottom hole pressure will be impossible to maintain at a set value when clogging of the return line choke takes place.

SUMMARY OF THE INVENTION

It is an object of the present invention to at least partly overcome the above problem.

This object, and other objects that will be apparent from the following description, is achieved by a system and method according to the appended independent claims. Embodiments are set forth in the appended dependent claims.

According to an aspect of the present invention, there is provided a system for passing matter in a flow passage of an oil and/or gas drilling or production installation, in particular for passing trash or drill cuttings in a drilling fluid return line, the system comprising: at least two valves arranged in series in said flow passage; and control means adapted to selectively or sequentially actuate said at least two valves, such that the matter is allowed to pass said at least two valves in the flow passage.

The present system allows drill cutting and/or trash to pass said valves when drilling in a managed pressure mode or taking a kick from an unstable oil or gas well without experiencing unwanted variations in upstream pressure. By means of the present system, managed pressure drilling may be performed at higher drilling fluid flowrates and pressures, and a well kick can be taken in a safe and controlled manner. Also, if one of said at least two valves fails (e.g. gets stuck in a fully open position), the other valve(s) may be used to regulate flow in the passage. Hence, the present system provides for redundancy over e.g. a single choke solution.

Said at least two valves may comprise a first valve and a second valve, wherein the control means is adapted to first actuate the first valve from a regulating position to a more open position and back to a regulating position and then actuate the second valve from a regulating position to a more open position and back to a regulating position.

The system may further comprise detection means adapted to detect a condition in the flow passage, wherein the control means is adapted to automatically actuate said at least two valves upon or following detection of said condition by the detection means. Hence, the matter is automatically passed past or through the valves, without manual intervention. Said condition may for instance be a reduction in flow rate in the flow passage downstream of one of said at least two valves, the reduction in flow rate being caused by trash or drill cuttings getting stuck in the valve.

The system may further comprise a buffer chamber placed in the flow passage between two of said valves. The buffer chamber may have a cross section in a plane substantially perpendicular to a general flow direction through the flow passage, which cross section is larger than that of portions of the flow passage adjacent to the buffer chamber.

Said at least two valves may be gate valves, and at least one of said gate valves may be provided with an extended gate port. An example of a gate valve with an extended gate port is disclosed in the applicant's co-pending patent application NO20100799 entitled "Gate valve, method for returned drilling mud pressure control and/or well killing, and uses of a gate valve", the content of which herein is incorporated by reference.

According to another aspect of the present invention, there is provided a method for passing trash or drill cuttings in a drilling fluid return line, wherein at least two valves are arranged in series in a flow passage forming part of or being connected to the drilling fluid return line the drilling fluid return line, the method comprising: selectively or sequentially actuating said at least two valves. This aspect of the invention may exhibit the same or similar features and technical effects as the previously described aspect.

Said at least two valves may comprise a first upstream valve followed by a second downstream valve, wherein actuating said at least two valves comprises, in sequence: opening the first valve from a regulating position to a more open position, while the second valve is in a regulating position; passing the material through the first valve to a location in the flow passage between the first valve and the second valve; returning the first valve to a regulating position; opening the second valve from the regulating position to a more open position; passing the material through the second valve; and returning the second valve to a regulating position.

The method may further comprise: detecting a reduction in flow rate in the flow passage downstream of one of said at least two valves; and upon or following detection of said reduction, automatically actuating said at least two valves.

BRIEF DESCRIPTION OF THE DRAWINGS

These and other aspects of the present invention will now be described in more detail, with reference to the appended drawings showing currently preferred embodiments of the invention.

DETAILED DESCRIPTION OF THE PREFERRED EMBODIMENTS

Figure 1:
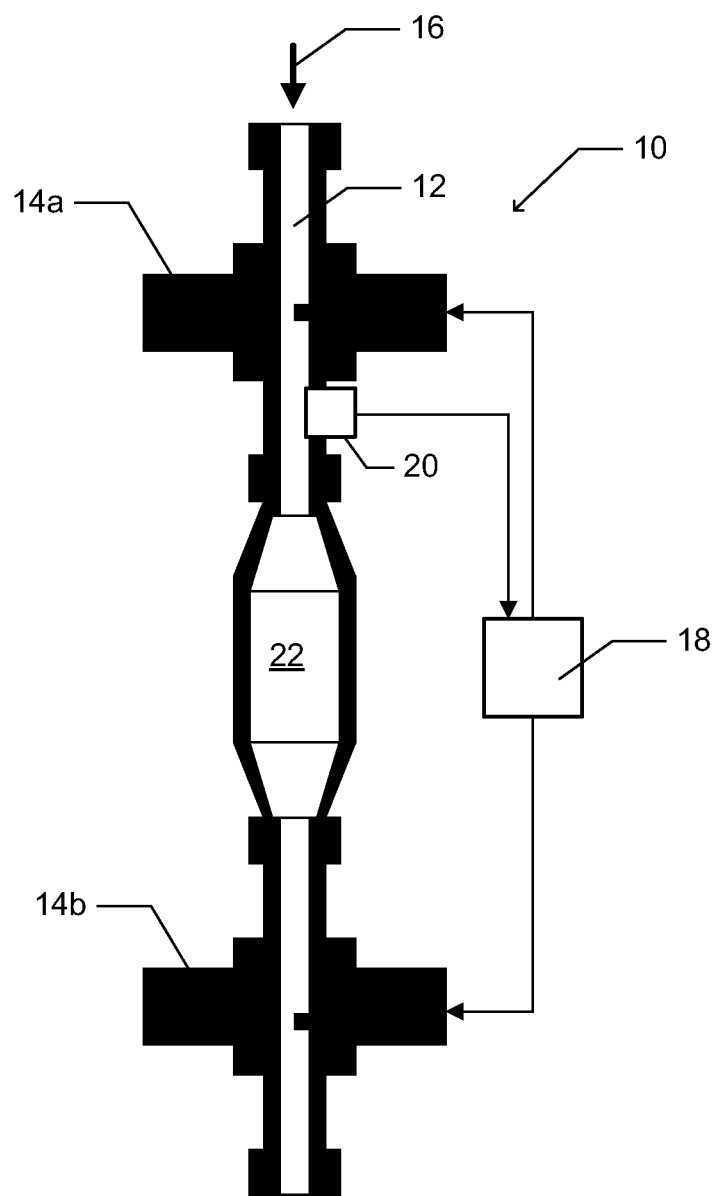
FIG. 1 is a schematic illustration of a system according to an embodiment of the present invention.

FIG. 1 is a schematic illustration of a system 10 according to an embodiment of the present invention. A particular application of the present invention is passing trash or drill cuttings past or through flow regulating means in a drilling fluid return line of an oil and/or gas drilling installation. In this particular application, the present system 10 may be parallel to or at least partly replace the choke manifold in the drilling installation. The trash or drill cuttings may include solids, gumbo clay, sandstone(s), etc.

The system 10 comprises a flow passage 12. The flow passage 12 may for instance be a part of a return line for drilling fluid, or the flow passage 12 may be connected to such a return line. The drilling fluid may for instance be drilling mud or seawater.

The system 10 further comprises a first valve 14a, and a second valve 14b. The valves 14a, 14b may for instance be (traditional) adjustable chokes, gate valves, etc. A particular gate valve that may be used in the present system will be explained further with reference to FIG. 3. Each valve 14a, 14b is adjustable between a (fully) open position, a closed position, and at least one intermediate regulating position or state. In the regulating position, the flow through the valve is more limited than when the valve is in the fully open position or state. A general function of the two valves 14a, 14b is to regulate the overall flow of e.g. drilling fluid returning from the borehole in the flow passage 12. In the present system 10, the valve 14a, 14b are arranged in series in or along the flow passage 12, as illustrated in FIG. 1. The flow direction through the passage 12 is indicated by arrow 16 in FIG. 1. The first valve 14a may be referred to as an upstream valve 14a, and the second valve 14b may be referred to as a downstream valve 14b.

The system 10 further comprises a control means 18. The control means 18 is able to communicate with the two valves 14a, 14b for actuating the two valves 14a, 14b via associated valve actuators. The two valves 14a, 14b may for instance be hydraulically actuated, but is not limited thereto.

The system 10 further comprises a detection means 20. The detection means 20 is adapted to detect a reduction in flow rate in the passage 12 downstream of the first valve 14a. The detection means 20 may for instance be a flow meter placed in the passage 12 downstream of the first valve 14a, but upstream of the second valve 14b, as illustrated in FIG. 1. Further, the detection means 20 is able to communicate with the control means 18. When the detection means 20 detects the reduced flow, it may send a signal to the control means 18 which when it receives said signal starts actuation of the valves 14a, 14b, as will be explained further below. The reduction in flow rate triggering the control means 18 may for instance be any reduction, a predetermined absolute reduction, or a relative reduction in flow rate.

Additional inputs to the control means 18 may include bottom hole pressure, rig mud pump volume, back pressure pump volume, pressure in drill pipe, rate of drill bit penetration, valve positions, etc.

Further, a buffer chamber 22 may be arranged in the flow passage 14 between the two valves 14a, 14b. The buffer chamber 22 has a larger diameter than the rest of the passage 14. The buffer chamber 22 allows for gas expansion, as it will be explained more below.

The operation of the system 10 will now be explained with further reference to FIGS. 2a-2d. Basically, matter like trash and/or drill cuttings is allowed to pass a lock formed by the two valves 14, 14b, wherein the control means 18 functions as a lock-keeper.

Figures 2A, 2B, 2C, 2D:
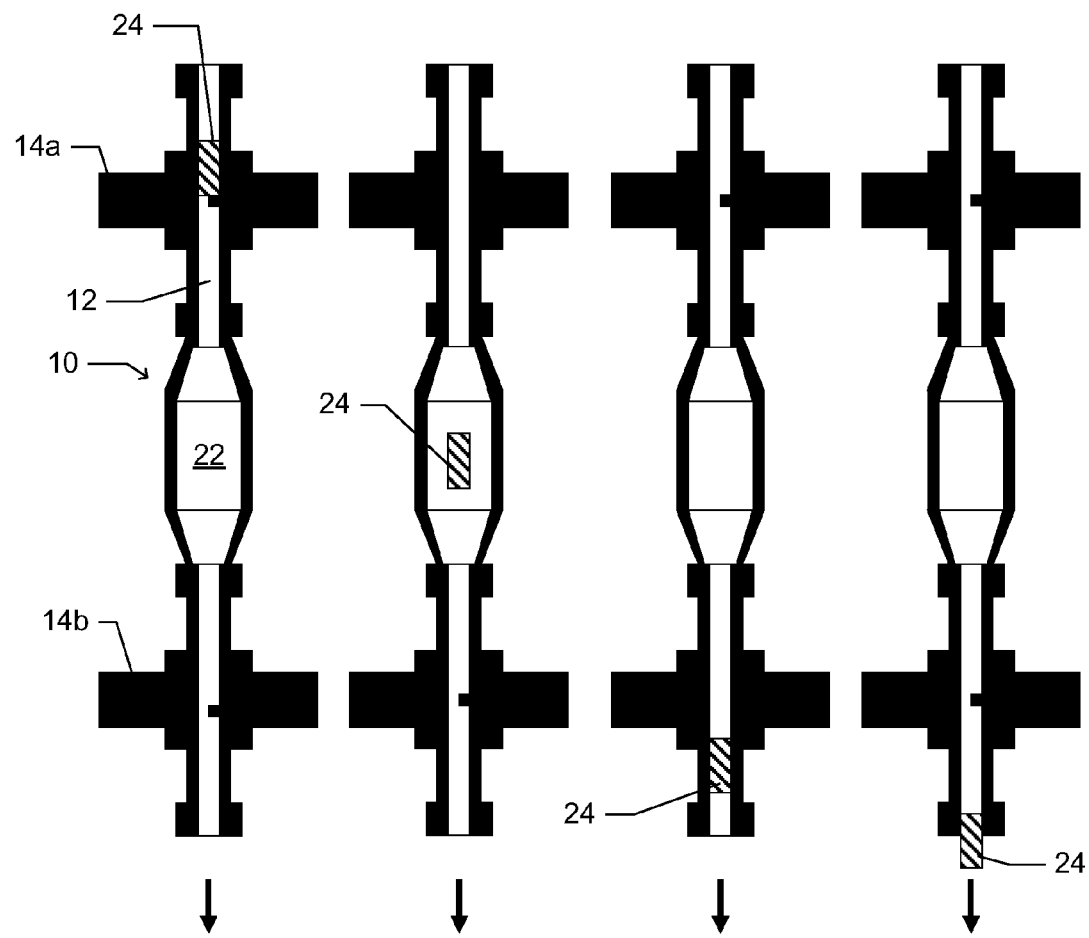
FIGS. 2a-2d shows an exemplary operation of the system in FIG. 1.

In FIG. 2a, both valves 14a, 14b are in a regulating position wherein the flow through the passage 12 is somewhat restricted compared to fully opened positions of the valves 14a, 14b. Further, trash or drill cuttings 24 has appeared upstream of the first calve 14a. As the trash 24 obstructs or clogs the first valve 14a, this is detected as a reduction in flow rate by the detection means 20 (not shown in FIGS. 2a-2d). The detection means 20 then alerts the control means 18 (not shown in FIGS. 2a-2d), which automatically opens the first valve 14a towards the fully open position. To handle large trash, the first valve 14a may be completely opened.

When the first valve 14a is opened, the trash 24 may pass the first valve 14a into the buffer chamber 22, as illustrated in FIG. 2b. As appreciated, the trash 24 is "propelled" by the flow of e.g. drilling fluid in the passage 12.

Then the first valve 14a is returned to the regulating position, while the second valve 14b is opened towards the fully open position. This allows the trash 24 to pass also the second valve 14b (FIG. 2c).

Thereafter, the second valve 14b may be returned to the regulating position (FIG. 2d).

The two valves 14a, 14b and the sequential actuation thereof allow the trash or drill cuttings 24 to pass flow regulating means (i.e. valves 14, 14b) in the passage 12 with minimum variation of upstream pressure.

The next time trash or drill cuttings is/are detected at the first valve 14a, the actuation of the two valves 14a, 14b as illustrated in FIGS. 2a-2d may be repeated.

Further, once the trash 24 has been detected by the detection means 18, the commands from the control means 18 to the two valves 14a, 14b may be submitted according to a predetermined time table or schedule. Alternatively, additional sensor means may be employed to track the trash passing past (or through) the valves 14a, 14b and time the actuation of the valves 14a, 14b accordingly.

Further, when the trash 24 is in the buffer chamber 22 and the second valve 14b opens fully, a sudden pressure drop will occur and the liquid gas (if gas is present) within the drilling fluid will boil to gas. The buffer chamber 22 will then present oscillations and hammering when the second valve 14b returns back to the regulating position. Also, input from a pressure sensor upstream of the first upstream valve 14a can be used simultaneously to achieve the correct pressure at all times.

Also, before the first valve 14a is opened, the second valve 14b may be quickly opened and returned to the regulating position to ensure that no trash is trapped in the second valve 14b.

Figure 3:
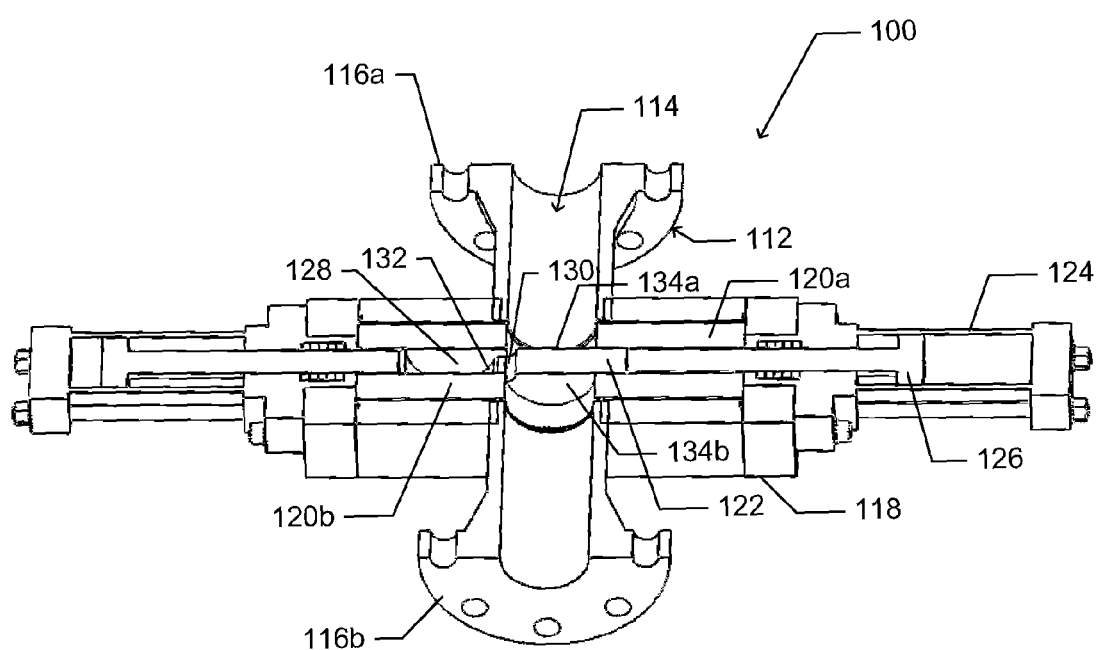
FIG. 3 is a sectional view in perspective of a gate valve that may be used in the present invention.

FIG. 3 shows a gate valve 100 that may be used as valve 14a and 14b in the present invention. The gave valve is also disclosed in the applicant's co-pending patent application NO20100799 entitled "Gate valve, method for returned drilling mud pressure control and/or well killing, and uses of a gate valve". The gate valve 100 comprises a gate body or housing 112. The gate body 112 defines a flow passage 114 formed as a straight bore with a substantially circular cross section. At one end of the passage 114, the gate body 112 is provided with a first or upper flange 116a for connection to e.g. a pipe (not shown in FIG. 3). A second or lower flange 116b is likewise provided at the other end of the passage 114, for connection to another member, e.g. a pipe (not shown in FIG. 3). A valve bonnet 118 of the gate body 120 further accommodates a first or upstream seat 120*a*, and a second or downstream seat 120*b*. Between the first and second seats 120*a* and 120*b* in the bonnet 118, there is provided a gate member 122. The gate member 122 is arranged to move in directions substantially perpendicular to the main flow direction of the passage 114, e.g. to the left and right in FIG. 3. The gate member 122 may be actuated e.g. hydraulically by means of at least one hydraulic cylinder 124 and valve stem 126, but it not limited only thereto. The gate member 122 includes a fixed gate port 128. The gate port 128 is an opening that extends through the gate member 122 from one face 134*a* to the other 134*b*. The gate port 128 has an overall circular cross section, with the same diameter as the passage 114. Hence, as the gate member 122 is appropriately positioned, the gate port 128 may be completely aligned with the passage 114, so that material in the passage 114 freely can pass the gate member 122. A gate valve like gate valve 100, wherein the gate has a port or opening which may be aligned with the flow passage, can generally be referred to as a through conduit gate valve. In the gate valve 110, a recess or groove 130 is further provided in the inner wall 132 of the gate port 128. The gate port 128 with the recess or groove 130 may be referred to as an extended gate port. The recess or groove 130 extends in a substantially straight path from the face 134*a* to the face 134*b*. The cross section of the recess or groove 130 in a plane substantially perpendicular to the general flow direction may be cup-shaped (e.g. semicircular) or lune-shaped or substantially circular. The cross section of the recess or groove 130 may be the same throughout the recess or groove 130. The width of the recess or groove 130 may for instance be about 12.5 millimeters or larger, and the depth of the recess or groove 130 may for instance be about 6.25 millimeters or more. When the rest of the gate port 128 is substantially removed from the passage 114, communication in the passage 114 through the gate member 122 may still be allowed via the recess or groove 130. When using the gate valve 100 in the system 10, this position or state may correspond to the regulating position mentioned in relation to FIGS. 2*a*-2*d*.

Figure 4:
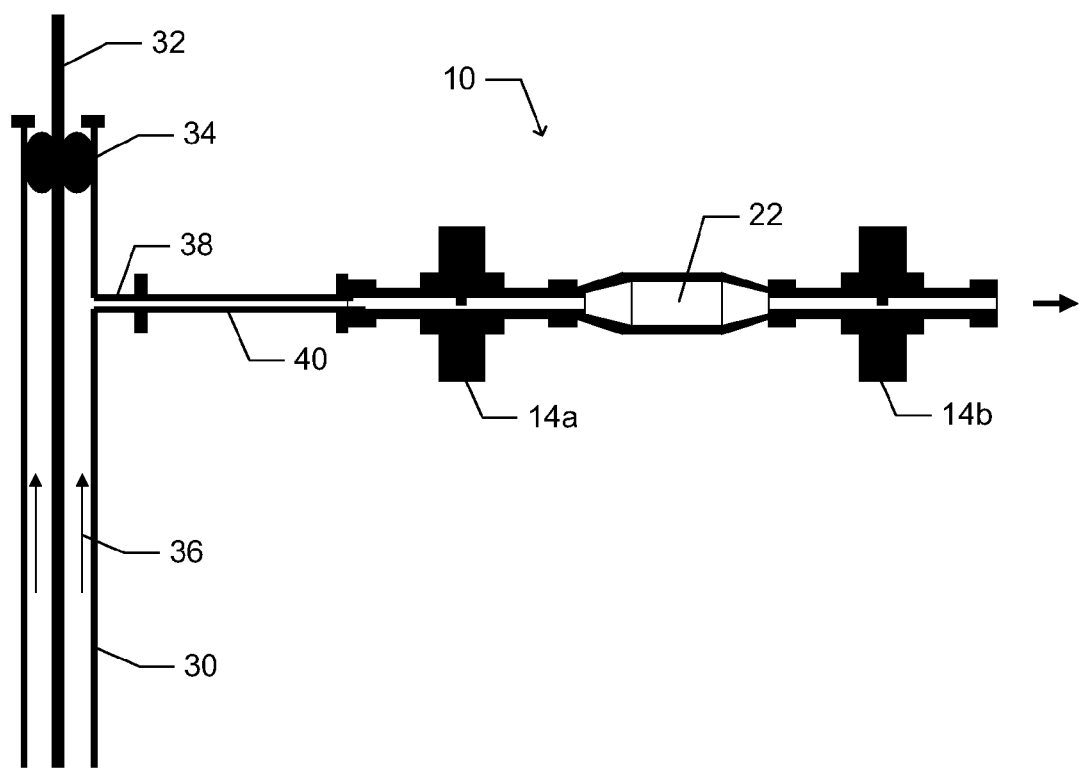
FIG. 4 schematically illustrates the present system installed in an MPD or UBD application.

FIG. 4 schematically illustrates the present system 10 installed in an MPD (Managed Pressure Drilling) or UBD (Under Balance Drilling) application.

In the MPD or UBD application, a borehole riser pipe 30 is vertically arranged. A drill pipe 32 is arranged in the borehole riser pipe 30. At the top of the borehole riser pipe 30, there is provided an annular seal 34. Mud and/or well fluid may raise in the borehole riser pipe 30, as indicated by deference sign 36.

Near the top of the borehole riser pipe 30, a side outlet 38 is provided. The side outlet 38 is connected to the present system 10 via a pipe or hose 40, such that matter from the side outlet 38 may pass into the flow passage 12 of the system 10. FIG. 4 also shows the two gate valves 14*a*, 14*b* in series, with the intermediate buffer chamber 22. The two gate valves 14*a*, 14*b* may be of the type shown in FIG. 3.

The person skilled in the art will realize that the present invention by no means is limited to the embodiments described above. On the contrary, many modifications and variations are possible within the scope of the appended claims.

The invention claimed is:

1. A system for passing matter in a flow passage of an oil and/or gas drilling or production installation, the matter comprising trash or drill cuttings and wherein the flow passage comprises a drilling fluid return line, the system comprising:
   first and second valves arranged in series in said flow passage such that flow through the flow passage can be restricted at both the first and second valves;
   a flow meter placed downstream from the first valve or the second valve;
   a control device connected to said first and second valves and said flow meter and configured to selectively or sequentially actuate said first and second valves, such that the matter is allowed to pass said valves in the flow passage; and
   a buffer chamber placed in the flow passage between said first and second valves;
   wherein the buffer chamber has a cross section in a plane substantially perpendicular to a general flow direction through the flow passage, wherein the cross section is larger than that of portions of the flow passage adjacent to the buffer chamber.

2. The system according to claim 1, wherein the control device is adapted to first actuate the first valve from a regulating position to a more open position and back to a regulating position and then actuate the second valve from a regulating position to a more open position and back to a regulating position.

3. The system according to claim 2, wherein said first and second valves are gate valves.

4. The system according to claim 1, wherein the flow meter is configured to detect a condition in the flow passage, wherein the control device is adapted to automatically actuate said first and second valves upon or following detection of said condition by the flow meter.

5. The system according to claim 4, wherein said condition is a reduction in flow rate in the flow passage downstream of one of said first and second valves.

6. The system according to claim 5, wherein said first and second valves are gate valves.

7. The system according to claim 4, wherein said first and second valves are gate valves.

8. The system according to claim 1, wherein said first and second valves are gate valves.

9. The system according to claim 8, wherein at least one of said gate valves is provided with an extended gate port.

10. The system as claimed in claim 1 wherein the control device is further configured to control operation of the first and second valves to restrict the flow.

11. A method for passing trash or drill cuttings in a drilling fluid return line, wherein first and second valves are arranged in series in a flow passage and flow through the flow passage can be restricted at both the first and second valves upon actuation forming part of or being connected to the drilling fluid return line, the method comprising:
    providing a buffer chamber placed in the flow passage between said first and second valves, wherein the buffer chamber has a cross section in a plane substantially perpendicular to a general flow direction through the flow passage, wherein the cross section is larger than that of portions of the flow passage adjacent to the buffer chamber;
    providing a flow meter downstream of one of said first and second valves;
    detecting a reduction in flow rate in the flow passage downstream of one of said first and second valves;
    upon or following detection of said reduction, automatically actuating said first and second valves selectively or sequentially to allow the trash or drill cuttings to pass the first and second valves in the flow passage.

12. The method according to claim 11, wherein said first and second valves comprise a first upstream valve followed by a second downstream valve, and wherein actuating said first and second valves comprises, in sequence:

opening the first valve from a regulating position to a more open position, while the second valve is in a regulating position;

passing the material through the first valve to a location in the flow passage between the first valve and the second valve;

returning the first valve to a regulating position;

opening the second valve from the regulating position to a more open position;

passing the material through the second valve; and returning the second valve to a regulating position.

13. The method as claimed in claim 11, further comprising controlling the first and second valves to restrict the flow.

* * * * *